United States Patent
Han et al.

(10) Patent No.: US 12,388,734 B2
(45) Date of Patent: Aug. 12, 2025

(54) CLUSTER AVAILABILITY MONITORING AND ALERTING

(71) Applicant: SAP SE, Walldorf (DE)

(72) Inventors: Sunyoung Han, Seoul (KR); Young Hun Kim, Bucheon (KR); Jongheon Park, Yongin-si (KR); Incheol Kim, Incheon (KR); Jihun Kang, Seoul (KR); Chul Won Lee, Seoul (KR)

(73) Assignee: SAP SE, Walldorf (DE)

( * ) Notice: Subject to any disclaimer, the term of this patent is extended or adjusted under 35 U.S.C. 154(b) by 472 days.

(21) Appl. No.: 17/826,965

(22) Filed: May 27, 2022

(65) Prior Publication Data

US 2023/0388205 A1    Nov. 30, 2023

(51) Int. Cl.
    *H04L 43/065* (2022.01)
    *G06F 11/30* (2006.01)
    *H04L 43/10* (2022.01)

(52) U.S. Cl.
    CPC ........ *H04L 43/065* (2013.01); *G06F 11/3006* (2013.01); *G06F 11/3055* (2013.01); *H04L 43/10* (2013.01)

(58) Field of Classification Search
    CPC .... H04L 43/10; H04L 43/065; G06F 11/3055; G06F 11/3006
    See application file for complete search history.

(56) References Cited

U.S. PATENT DOCUMENTS

| | | | |
|---|---|---|---|
| 10,630,566 B1* | 4/2020 | Nguyen | H04L 43/0817 |
| 11,895,194 B2* | 2/2024 | Markuze | H04L 67/10 |
| 2016/0380916 A1* | 12/2016 | Gnaneswaran | H04L 47/803 709/224 |
| 2022/0138070 A1* | 5/2022 | Mokashi | G06F 9/5072 709/224 |

* cited by examiner

*Primary Examiner* — Marcus Smith
*Assistant Examiner* — Rowan K Fakhro
(74) *Attorney, Agent, or Firm* — Buckley, Maschoff & Talwalkar LLC (57) ABSTRACT

Systems and methods include execution of a first instance of a first service in an execution environment, transmission of a ping to an external port of the first instance, determination of a ping result corresponding to the transmitted ping, storage of metadata indicating a status of the first instance of the first service, determination of a health status metric of the first instance and providing the health status metric via an internal port of the execution environment, and determination of whether to generate an alert associated with the first instance based on the ping result, the status, and the health status metric.

9 Claims, 8 Drawing Sheets

| PING RESULT | PING RESULT REASON | SERVICE STOPPED FLAG | OPERATIONS COMPLETE FLAG | HEALTH STATUS METRIC | PRESUMED SERVICE STATE | PRESUMED LOAD/ HEALTH | ALERT GENERATED |
|---|---|---|---|---|---|---|---|
| N/A (NO AGENT STARTED) | | | | | <EMPTY> | | |
| PROBABLY FAILED | | FALSE | FALSE | UNDETERMINED | STARTING | | NO |
| PROBABLY FAILED | | FALSE | FALSE | UNDETERMINED | OPERATING | | NO |
| SUCCESSFUL | 0 = NO ERROR | FALSE | TRUE | HEALTHY | RUNNING | OPERATIONAL | YES, IF PING CHECK FAILED |
| USUALLY SUCCESSFUL | 1 = TIMEOUT | FALSE | TRUE | HEALTHY | RUNNING | HIGHLY LOADED | NO |
| FAILED | 2 = CONNECTION FAILED | FALSE | TRUE | UNHEALTHY | RUNNING | INDEX SERVER STOPPED | YES |
| FAILED | 2 = CONNECTION FAILED | FALSE | TRUE | HEALTHY | RUNNING | OPERATIONAL BUT PROXY DOWN | YES |
| | | TRUE | FALSE | UNDETERMINED | STOPPING | | NO |
| FAILED | 2 = CONNECTION FAILED | TRUE | TRUE | UNHEALTHY OR EMPTY | STOPPED | | NO |
| PROBABLY FAILED | | FALSE OR TRUE | TRUE | UNDETERMINED | DELETING | | NO |
| N/A (NO AGENT STARTED) | | | | | DELETED | | |

CLUSTER AVAILABILITY MONITORING AND ALERTING

BACKGROUND

Modern system landscapes consist of multiple computing services provided by disparate computing hardware. In some cases, the computing services may be centrally managed. For example, a central orchestration service may manage different data storage services such as a cloud relational database, a data lake, and an OnLine Transaction Processing (OLTP) database.

Cloud computing technologies have drastically increased the number of computing service instances which may be provided within a system landscape. In the above example, the system landscape may include thousands of instances of the cloud relational database. Centralized monitoring of such a large number of service instances is problematic.

For example, service instance monitoring in such cases may simply include periodic transmission of a ping to an external port of each service instance. The result of the ping is reviewed to determine whether an alert should be generated. If so, the alert (e.g., service offline) is presented to an associated operations team.

The above approach may result in an undesirable number of false positive alerts. For example, a ping may timeout even if a service instance is online because all existing Structured Query Language (SQL) execution threads which service incoming SQL requests are currently occupied. Nevertheless, the timeout may result in issuance of an alert, the processing of which consumes resources unnecessarily.

What is needed are systems to monitor service availability while reducing the occurrence of false positives.

DETAILED DESCRIPTION

The following description is provided to enable any person in the art to make and use the described embodiments. Various modifications, however, will be readily-apparent to those in the art.

According to some embodiments, a ping agent is assigned to an application upon execution of the application. The ping agent is operated to ping an external port of the application and obtain a ping result. A health status metric is also obtained from a health check mechanism accessible via an internal port of the application. Next, it is determined whether to generate an alert based on the ping result, the health status metric, and status metadata of the application (e.g., RUNNING, STOPPED, DELETED). Advantageously, it may be determined to not generate a result even if the ping fails, if, for example, the status metadata indicates that the application is running and the health status metric indicates that the application is reachable.

Embodiments may thereby reduce a number of false positive alerts. Such false positive alerts can be avoided in cases where the application is heavily loaded (e.g., with respect to memory or processor utilization) or the number of permitted connections has reached a limit.

Figure 1:
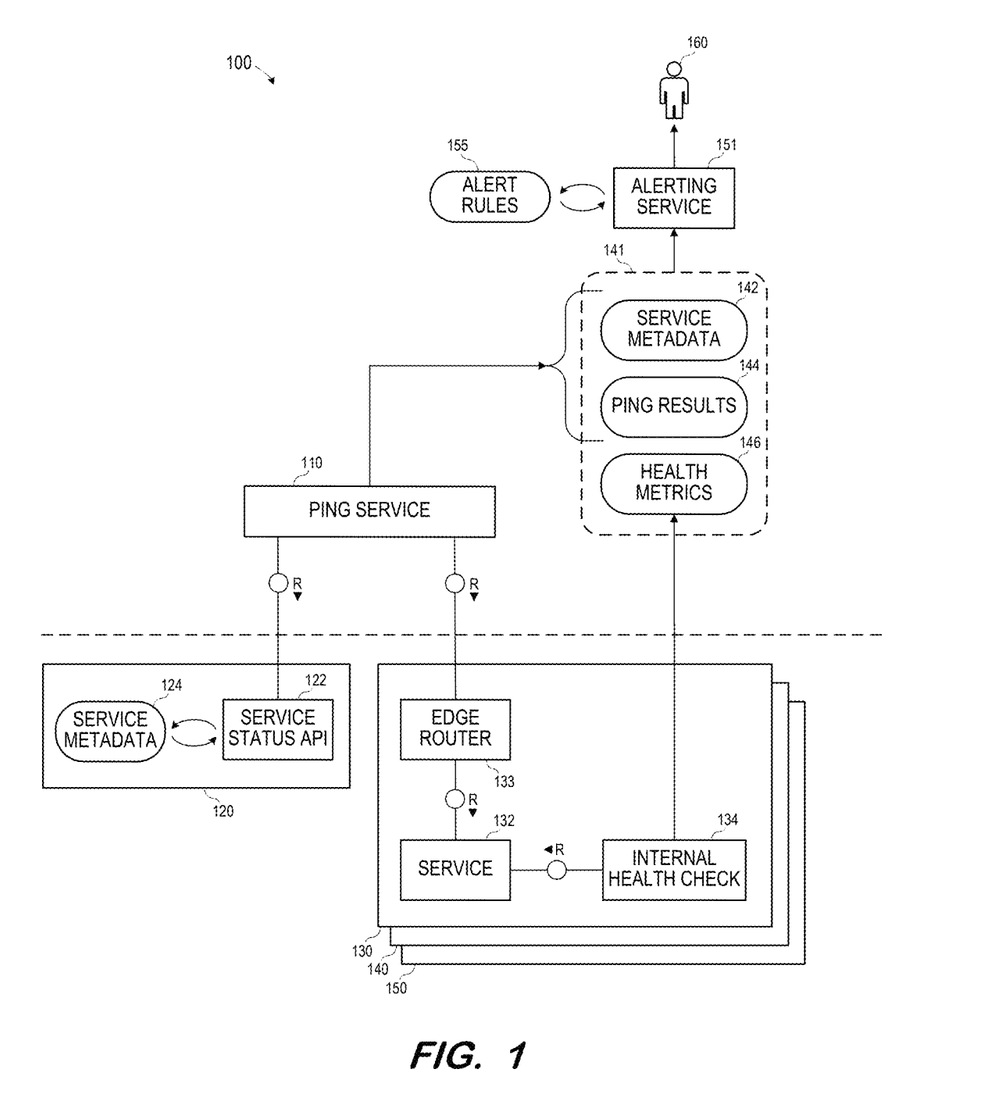
FIG. 1 is a block diagram of an architecture to monitor service instances according to some embodiments.

FIG. 1 is a block diagram of architecture 100 according to some embodiments. The illustrated elements of architecture 100 and of all other architectures depicted herein may be implemented using any suitable combination of computing hardware and/or processor-executable program code that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Ping service 110 may comprise processor-executable program code executing suitable hardware to communicate with orchestrator 120 and execution environments 130, 140 and 150. Orchestrator 120 may be responsible for maintaining the desired states of execution environments 130, 140 and 150. The current states of execution environments 130, 140 and 150 may be stored in service metadata 124 and acquired by ping service 110 via service status API 122.

Execution environments 130, 140 and 150 may comprise separate hardware servers or separate virtual machines. One or more of execution environments 130, 140 and 150 may execute within a single server or virtual machine. In some embodiments, each of execution environments 130, 140 and 150 comprises a container in which a containerized application may be executed and managed. Such containers may be implemented by one or more nodes of a cluster (e.g., a Kubernetes cluster) as is known in the art.

The following description of the components of execution environment 130 may similarly apply to corresponding components of execution environments 140 and 150. Ping service 110 may transmit a ping to an external (e.g., SQL) port of edge router 133. The external port of edge router 133 may comprise a port accessible by users (not shown) of service 132. Ping service 110 stores results of such pings as ping results 144 of data 140. Ping results 144 may comprise a success flag (e.g., Y/N) and a reason for a failed ping result, if applicable (e.g., timeout, connection failed). Ping service 110 also stores acquired service metadata associated with the statuses of each service of environments 130, 140 and 150 as service metadata 142.

Environment 130 also includes internal health check 134 to determine information regarding the health of service 132. Internal health check 134 may be accessed via an internal port of execution environment 130 (i.e., a port which is not accessible to external users). Systems for accessing information determined by internal health check 134 will be described below. In the meantime, it is noted that the information determined by internal health check 134 may be acquired and also stored in data 141 as health metrics 146.

Data 141 may comprise any one or more data structures which need not be co-located. Data 141 may include service metadata 142, ping results 144 and health metrics 146 for each service to be monitored.

In this regard, alerting service 151 may operate to apply alert rules 155 to data 141 in order to determine whether to generate corresponding alerts. An alert rule 155 may evaluate most-recent service metadata 142, ping results 144 and health metrics 146 associated with a service and determine whether to generate and present an alert to operations team 160 based thereon. Examples of such alert rules will be provided below.

Figure 2:
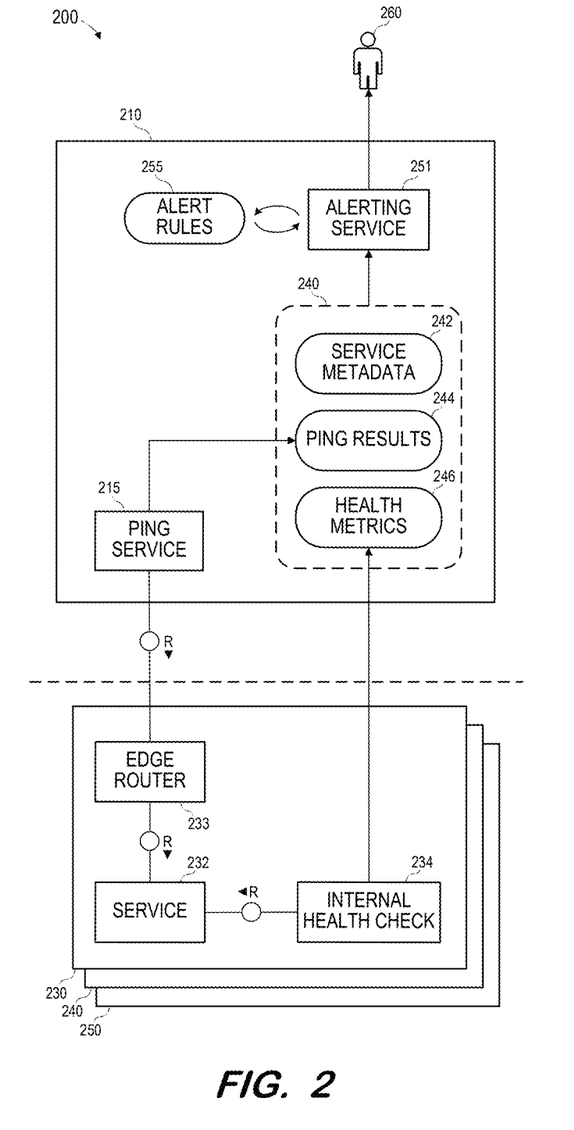
FIG. 2 is a block diagram of an architecture to monitor service instances according to some embodiments.

FIG. 2 illustrates architecture 200 according to some embodiments. Execution environments 230, 240 and 250 may be implemented and operate as described above with respect to execution environments 130, 140 and 150. In this regard, orchestrator 210 may be responsible for maintaining the desired states of execution environments 230, 240 and 250.

Ping service 215 of architecture 200 is implemented within orchestrator 210. Accordingly, ping service 215 may directly access (i.e., without use of an API) service metadata 242 which is stored within orchestrator 210 and indicates the statuses of execution environments 230, 240 and 250.

Ping service 210 may transmit a ping to an external port of edge router 233 of environment 230 or to an edge router associated with either of environments 240 and 250. Ping service 210 stores results of such pings as ping results 244 of data 240. Data 240 also stores health metrics determined by internal health check 234 as described above.

Alerting service 251 of orchestrator 210 may operate to apply alert rules 255 to data 240 in order to determine whether to generate corresponding alerts. Any generated alerts may be presented to operations team 260, which may act thereon.

Figure 3:
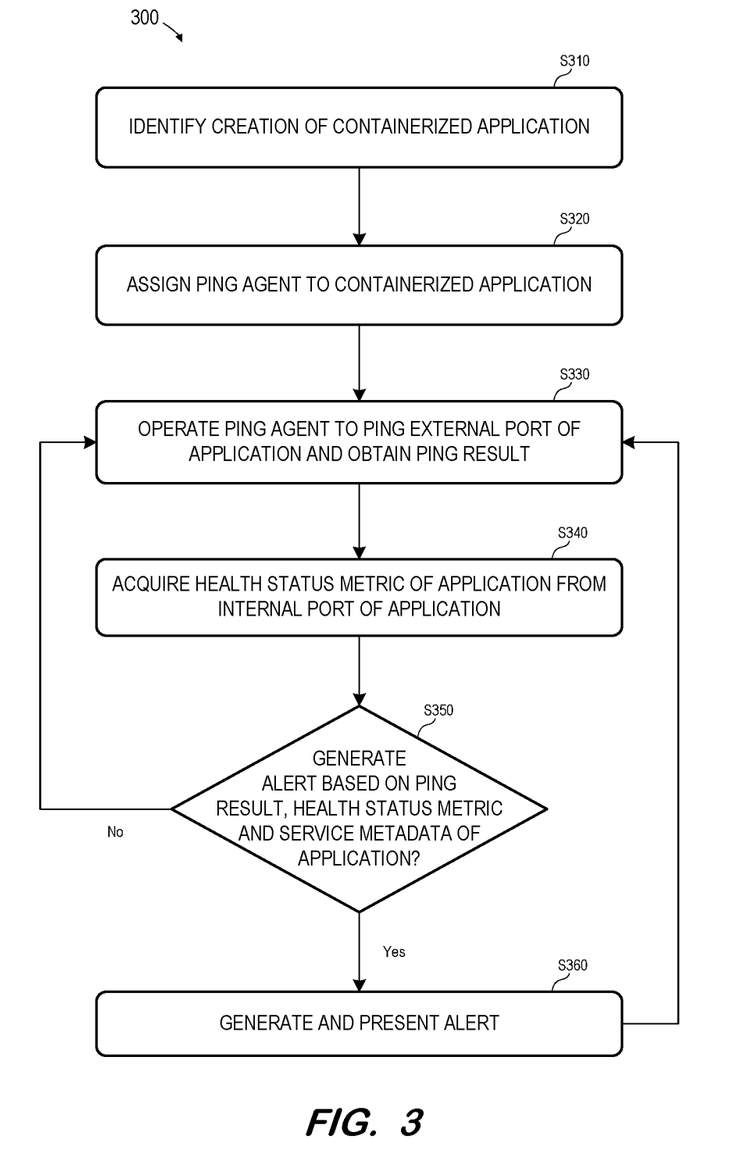
FIG. 3 is a flow diagram of a process to monitor service instances according to some embodiments.

FIG. 3 comprises a flow diagram of process 300 according to some embodiments. Process 300 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

At S310, the creation of a containerized application is identified. Although process 300 relates to containerized applications, embodiments are not limited thereto. The creation of a containerized application may be identified based on a lifecycle event which represents creation of the containerized application.

In some examples of S310, a command to instruct creation of a containerized application is provided to an orchestrator such as orchestrator 120 or orchestrator 210. The containerized application may be considered a service instance, as the two terms are used interchangeably herein. The orchestrator updates corresponding metadata to indicate the creation of the containerized application and the updated metadata is analyzed by a ping service (located within or outside orchestrator 120) to identify the creation of the containerized application.

Figure 4:
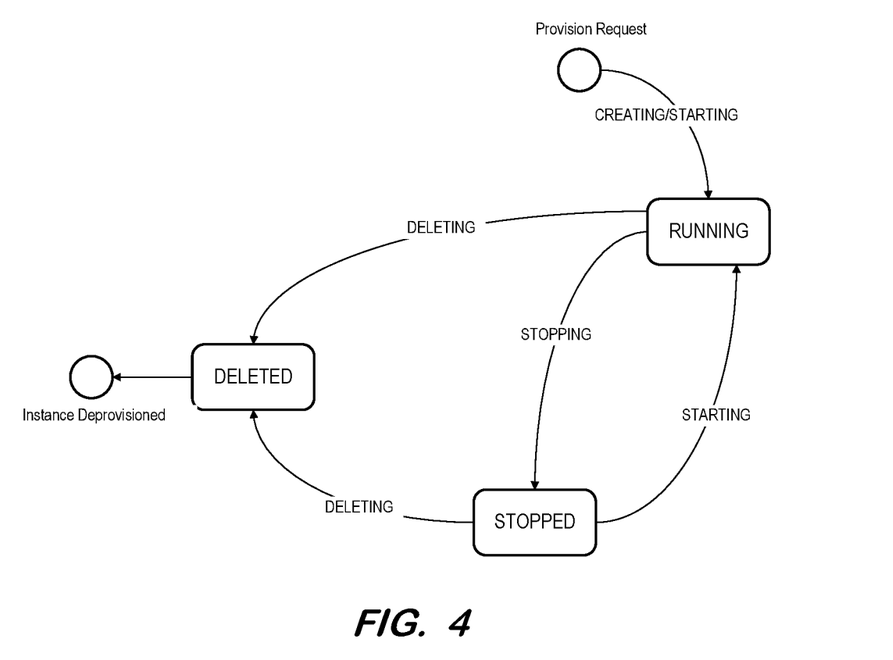
FIG. 4 is a state diagram of a service instance according to some embodiments.

FIG. 4 is a state diagram of a service instance according to some embodiments. As shown, a request may be received to provision an instance prior to process 300. Such a request generates metadata which associates the CREATING state with the new service instance. This state transitions to the STARTING state (which results in updating of the associated metadata) until the service instance reaches the RUNNING state. From the RUNNING state, lifecycle events may occur which cause the service instance to transition through the DELETING state to the DELETED state, or from the STOPPING state to the STOPPED state. In addition, the service instance may transition from the STOPPED state through the STARTING state to the RUNNING state, or from the STOPPED state through the DELETING state to the DELETED state. All state changes may be reflected in the metadata (e.g., 142, 242) associated with the service instance and maintained by the orchestrator.

A ping agent is assigned to the containerized application at S320. According to some embodiments, a ping agent may be assigned to up to a certain number (e.g., 30) of containerized applications. Accordingly, if an existing ping agent instance is already assigned to the certain number of containerized applications, a new ping agent instance may be created at S320 and assigned to the newly-created application.

In some embodiments, the ping agent assigned to a containerized application depends on the type of the containerized application. For example, a first ping agent may be assigned only to cloud database service instances, while a second ping agent may be assigned only to OLTP instances. Accordingly, embodiments may include several instances of the first ping agent and several instances of the second ping agent, each of which is assigned to one or more of their corresponding type of service instances.

At S330, the assigned ping agent is operated to ping an external port of the application and obtain a ping result. The external port may be accessible to users, such as an SQL endpoint. The ping result may include a success flag and a reason as described above.

Next, at S340, a health status metric associated with the application is acquired from an internal port of the application. The internal port comprises a port which is not accessible to external users and which allows access to an internal health check mechanism. The health status metric may indicate reachability (i.e., connectivity), memory state, CPU consumption, etc.

At S350, it is determined whether to generate an alert based on the ping result, the health status metric and the service metadata of the application. Use of these three parameters may result in fewer false positive alerts than systems in which only one or two of these parameters are considered. If it is determined not to generate an alert, flow returns to S330 and continues as described above. In this regard, S330 and S340 may be executed in parallel according to respective periodic schedules (i.e., the frequency of execution of S330 and S340 need not be identical).

Figure 5:
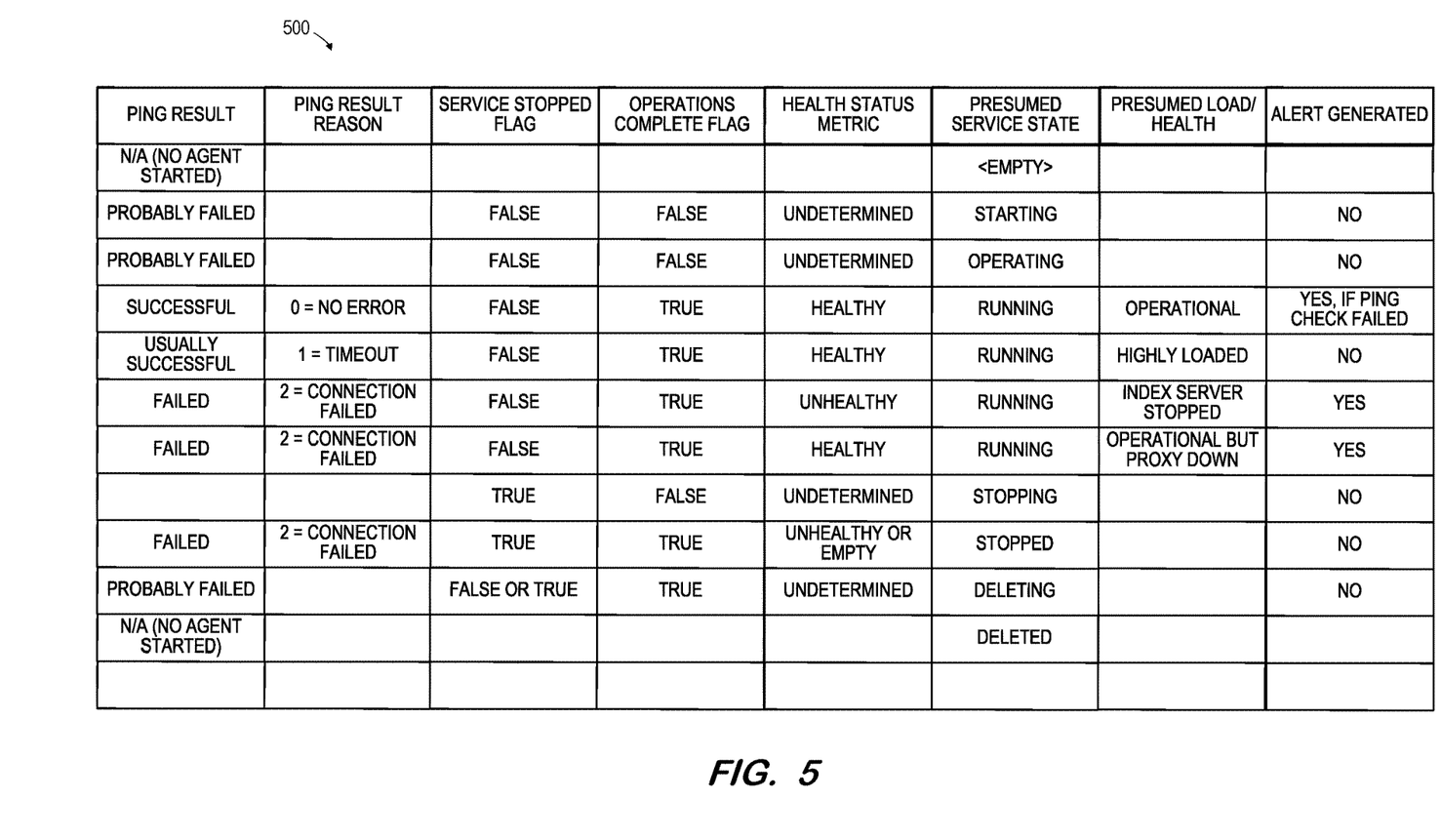
FIG. 5 is a tabular representation of metric and metadata values, and corresponding alert-related presumptions according to some embodiments.

FIG. 5 shows tabular representation 500 of metric values, metadata values and corresponding alert-related presumptions which may be used to determine whether to generate an alert according to some embodiments at S350. The columns Ping Result and Ping Result Reason represent information which may be acquired at S330, and the columns Service Stopped Flag and Operations Complete Flag represent service metadata according to some embodiments.

The values of Service Stopped Flag and Operations Complete Flag may be used to determine a status of a corresponding service instance, but embodiments are not limited to this status-related service metadata. For example, the service metadata used at S350 may simply comprise an identifier of one of the states shown in FIG. 3.

The Health Status Metric column of FIG. 5 represents health status metrics acquired at S340. These metrics may be acquired from an internal health check mechanism accessed via an internal port of a containerized application as described above.

The Presumed Service State and Presumed Load/Health columns for a given row provide presumptions based on the values present in the Ping Result, Ping Result Reason, Service Stopped Flag, Operations Complete Flag and Health Status Metric columns of the given row. Based on these presumptions, the Alert Generated column indicates whether an alert should be generated. The use of a ping result, a health status metric, and service metadata as described herein allows more accurate presumptions, and therefore more appropriate alert generation, than otherwise available.

For example, if the Ping Result is usually successful but occasionally fails due to a read timeout, the Service Stopped Flag is False and the Operations Complete Flag is True, prior systems may issue an alert. In some embodiments, the Health Status Metric in such a scenario may be Healthy and it is therefore presumed that the service is RUNNING and is simply highly loaded. Accordingly, no alert may be generated. In this regard, the internal port from which the health status metric is obtained may be associated with its own thread pool which is different from the highly-loaded thread pool that is associated with the external port which receives the pings.

In another example, the Ping Result fails due to a connection failure, the Service Stopped Flag is False, the Operations Complete Flag is True, and the Health Status Metric is Unhealthy. As shown in FIG. 5, it may be presumed in such a scenario that the service is RUNNING but that its index server is stopped. Accordingly, an alert may be generated which specifies these presumptions, thereby assisting the operations team in resolving the issue.

The Ping Result may also fail due to a connection failure while the Service Stopped Flag is False, the Operations Complete Flag is True, and the Health Status Metric is Healthy. In this scenario, it may be presumed that the service is RUNNING and that its proxy server is down. Again, a corresponding alert specifying these presumptions may be generated.

Figure 6:
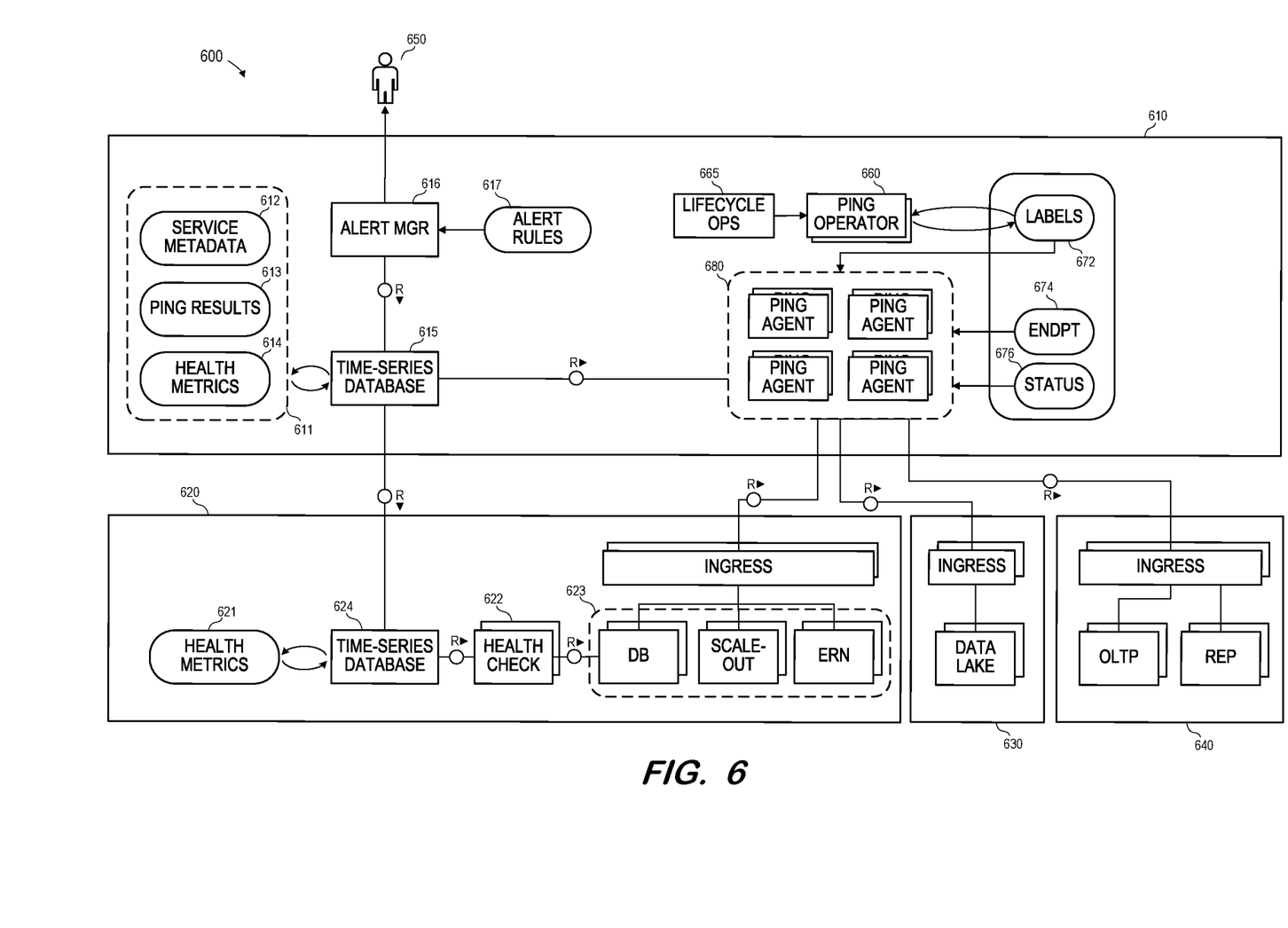
FIG. 6 is a block diagram of an architecture to monitor service instances according to some embodiments.

FIG. 6 is a block diagram of architecture 600 to monitor service instances according to some embodiments. Architecture 600 may comprise an implementation of architecture 200 and/or may execute process 300 in some embodiments.

Generally, orchestrator 610 manages the states of service instances (e.g., containerized applications) executing within clusters 620, 630 and 640. In the present example, cluster 620 executes database server instances, cluster 630 executes data lake instances, and cluster 640 executes both OLTP server instances and replication server instances.

In order to provide scalability, orchestrator 610 includes one (or more) instance(s) of ping operator 660 to receive lifecycle operations 665 associated with service instances. Based on operations 665, ping operator 660 controls assignment of one of product-specific ping agents 680 to a service instance. For example, if a lifecycle operation 665 calls for creation of a database server instance within cluster 620, a ping operator 660 updates labels 672 to associate the database server instance with a ping agent 680 that corresponds to database server instances. The ping agent 680 reads labels 672 and configures itself to communicate with the instance using endpoint information 674 (which may specify a corresponding SQL port) and status information 676.

As described above, orchestrator 610 also obtains health metrics 621 acquired by health check component 622. In the illustrated example, instances of health check component 622 acquire health metrics (e.g., reachability data) from internal ports of containerized applications 623 and store health metrics 621 using a time-series database 624. Time-series database 624 may be federated across clusters and is therefore in federation with time-series database 615 of orchestrator 610 to periodically replicate its data thereto Accordingly, thusly-received health metrics are stored in health metrics 614 of data 611.

Also stored in data 611 of orchestrator 610 are ping results 613 obtained from ping agents 680 by database 615 (e.g., via a scraping API) and service metadata 612 indicating the status of the service instances of clusters 620, 630, 640. Alert manager 616 uses data 611 and alert rules 617 to determine whether to generate alerts associated with the service instances and transmit the alerts to operations team 650. Alert rules 617 may be product (i.e., service)-specific in some embodiments.

Figure 7:
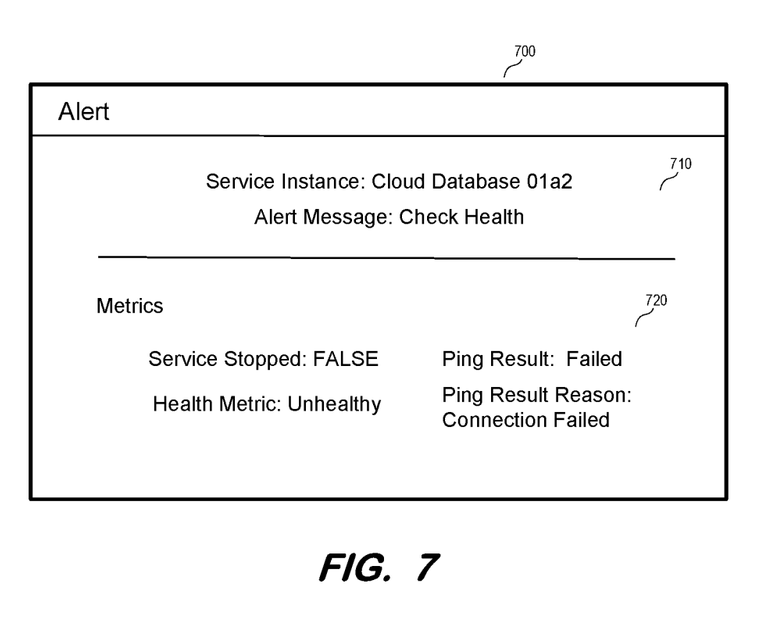
FIG. 7 is a view of a user interface presenting an alert generated according to some embodiments.

FIG. 7 is a view of alert interface 700 presenting an alert according to some embodiments. Alert interface 700 may be presented to an operations team via a monitoring application, an electronic mail message, or any other suitable medium.

Alert interface 700 includes area 710 specifying the particular service instance to which the alert is related, as well as a message "Check Health" indicating a type of the alert. Area 720 shown the metric values, metadata values and health metrics which resulted in generation of the alert. Embodiments are not limited to the form or content of alert interface 700.

Figure 8:
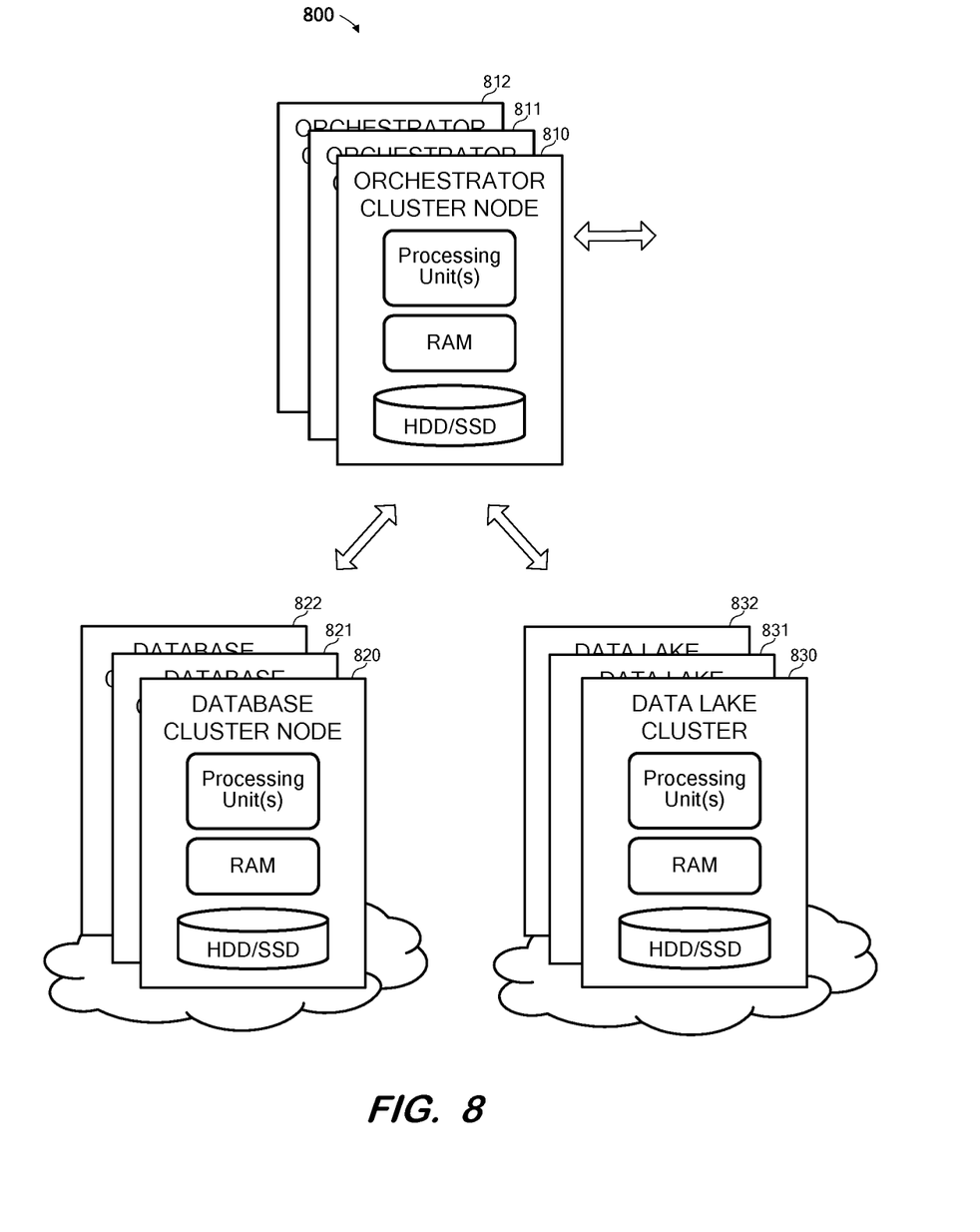
FIG. 8 is a block diagram of a cloud-based system according to some embodiments.

FIG. 8 illustrates cloud-based database deployment 800 according to some embodiments. Each depicted node may comprise a separate physical machine or a virtual machine. Such virtual machines may be allocated by a public cloud provider providing self-service and immediate provisioning, autoscaling, security, compliance and identity management features.

Orchestrator cluster nodes 810, 811 and 812 may operate to perform operations attributed herein to an orchestrator, while database cluster nodes 820, 821 and 822 and data lake cluster nodes 830, 831 and 832 execute service instances which may be monitored as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architecture 100 may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
an orchestrator comprising:
a plurality of ping agents, where each of the plurality of ping agents is assignable only to a respective type of service and where a first one of the plurality of ping agents is assignable only to a first type of service and a second one of the plurality of ping agents is assignable only to a second type of service; and
a ping operator to, in response to creation of a first instance of a first service, determine a type of the first service, determine a ping agent which is assignable only to the type of the first service, and assign the determined ping agent to the first instance of the first service to transmit a ping to an external port of the first instance and to determine a ping result corresponding to the transmitted ping;
an execution environment to execute the first instance of the first service;
a metadata store to store metadata indicating a status of the first instance of the first service;
a health check component to determine a health status metric of the first instance and to provide the health status metric via an internal port of the execution environment; and
an alert manager to determine whether to generate an alert associated with the first instance based on the ping result, the status, and the health status metric.

2. The system according to claim 1, wherein the execution environment is a container and the first instance of the first service is a containerized application.

3. The system according to claim 2, further comprising:
a second container to execute a second instance of the first service, the second instance comprising a second containerized application,
wherein the ping operator is to, in response to creation of the second instance of the first service, determine a second ping agent of the plurality of ping agents which is assignable to the type of the first service and assign the determined second ping agent to the second instance of the first service to transmit a second ping to a second external port of the second container and to determine a second ping result corresponding to the transmitted second ping,
wherein the metadata store is to store metadata indicating a second status of the second containerized application,
wherein the health check component is to determine a second health status metric of the second containerized application and to provide the second health status metric via an internal port of the second container, and
wherein the alert manager is to determine whether to generate an alert associated with the second containerized application based on the second ping result, the second status, and the second health status metric.

4. A method comprising:
instantiating a first instance of a first service in an execution environment;
in response to instantiating the first instance of the first service, determining a type of the first service, determining, from a plurality of ping agents, where each of the plurality of ping agents is assignable only to a respective type of service, a ping agent which is assignable only to the type of the first service, and assigning the determined ping agent to the first instance of the first service;
operating the ping agent to transmit a ping to an external port of the first instance;
determining a ping result corresponding to the transmitted ping;
storing metadata indicating a status of the first instance of the first service;
determining a health status metric of the first instance and providing the health status metric via an internal port of the execution environment; and
determining whether to generate an alert associated with the first instance based on the ping result, the status, and the health status metric,
where a first one of the plurality of ping agents is assignable only to a first type of service and a second one of the plurality of ping agents is assignable only to a second type of service.

5. The method according to claim 4, wherein the execution environment is a container and the first instance of the first service is a containerized application.

6. The method according to claim 5, further comprising:
instantiating a second instance of the first service in a second container, the second instance comprising a second containerized application;
in response to instantiating the second instance of the first service, determining a second ping agent of the plurality of ping agents which is assignable only to the type of the first service and assigning the determined second ping agent to the second instance of the first service;
operating the second ping agent to transmit a second ping to a second external port of the second container;
determining a second ping result corresponding to the transmitted second ping;
storing metadata indicating a second status of the second containerized application;
determining a second health status metric of the second containerized application and providing the second health status metric via an internal port of the second container; and
determining whether to generate an alert associated with the second containerized application based on the second ping result, the second status, and the second health status metric.

7. A non-transitory computer-readable medium storing program code executable by one or more processing units to cause a computing system to:

execute a first instance of a first service in an execution environment;

in response to execution of the first instance of the first service, determine a type of the first service, determine, from a plurality of ping agents, where each of the plurality of ping agents is assignable only to a respective type of service, a ping agent of the plurality of ping agents which is assignable only to the type of the first service, and assign the determined ping agent to the first instance of the first service;

operate the ping agent to transmit a ping to an external port of the first instance;

determine a ping result corresponding to the transmitted ping;

store metadata indicating a status of the first instance of the first service;

determine a health status metric of the first instance and providing the health status metric via an internal port of the execution environment; and     determine whether to generate an alert associated with the first instance based on the ping result, the status, and the health status metric,     where a first one of the plurality of ping agents is assignable only to a first type of service and a second one of the plurality of ping agents is assignable only to a second type of service.

8. The medium according to claim 7, wherein the execution environment is a container and the first instance of the first service is a containerized application.

9. The medium according to claim 8, the program code executable by one or more processing units to cause a computing system to:

execute a second instance of the first service in a second container, the second instance comprising a second containerized application;

in response to execution of the second instance of the first service, determine a second ping agent of the plurality of ping agents which is assignable only to the type of the first service and assign the determined second ping agent to the second instance of the first service;

operate the second ping agent to transmit a second ping to a second external port of the second container;

determine a second ping result corresponding to the transmitted second ping;

store metadata indicating a second status of the second containerized application;

determine a second health status metric of the second containerized application and providing the second health status metric via an internal port of the second container; and     determine whether to generate an alert associated with the second containerized application based on the second ping result, the second status, and the second health status metric.

\* \* \* \* \*